United States Patent
van der Knokke

(10) Patent No.: US 6,709,163 B2
(45) Date of Patent: *Mar. 23, 2004

(54) FASTENING CAGE SEGMENT ENDS FOR SHEET-METAL CAGE FOR ROLLING-CONTACT BEARINGS

(75) Inventor: Henri van der Knokke, Niederwerrn (DE)

(73) Assignee: FAG Industrial Bearings AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/023,186
(22) Filed: Dec. 17, 2001

(65) Prior Publication Data
US 2002/0081053 A1 Jun. 27, 2002

(30) Foreign Application Priority Data
Dec. 23, 2000 (DE) .......................... 100 65 169

(51) Int. Cl.[7] .............................. F16C 33/38
(52) U.S. Cl. .................. 384/523; 384/527; 384/528; 384/531
(58) Field of Search ................. 384/572, 573, 384/575, 576, 577, 578, 579, 580, 523, 527–534

(56) References Cited

U.S. PATENT DOCUMENTS

| | | | |
|---|---|---|---|
| 2,591,160 A | | 4/1952 | Rudolph |
| 3,399,008 A | | 8/1968 | Farrell et al. |
| 3,495,889 A | * | 2/1970 | Nisbet et al. ............... 384/526 |
| 3,801,172 A | * | 4/1974 | Veglia ........................ 384/578 |
| 4,239,304 A | * | 12/1980 | Wakunami .................. 384/573 |
| 4,397,507 A | | 8/1983 | Kraus et al. |
| 4,435,024 A | * | 3/1984 | Tagawa et al. ............. 384/576 |
| 5,743,659 A | * | 4/1998 | Stewart ...................... 384/573 |
| 6,364,533 B1 | * | 4/2002 | van der Knokke .......... 384/572 |

FOREIGN PATENT DOCUMENTS

| | | |
|---|---|---|
| DE | 536500 | 10/1931 |
| DE | 849334 | 12/1951 |
| DE | 1007570 | 5/1957 |
| DE | 1079899 | 4/1960 |
| DE | 1251398 | 10/1967 |
| DE | 1 805 265 | 5/1970 |
| DE | 2132907 | 3/1972 |
| DE | 8008271 | 6/1980 |
| DE | 3041860 A1 | 6/1982 |
| DE | 3928913 C2 | 3/1990 |
| EP | 0016880 B1 | 5/1982 |
| EP | 1065396 * | 1/2001 |

* cited by examiner

Primary Examiner—Thomas R. Hannon
(74) Attorney, Agent, or Firm—Ostrolenk, Faber, Gerb & Soffen, LLP

(57) ABSTRACT

A sheet-metal cage for rolling-contact bearings, comprising at least one cage segment which is bent into a circular shape, of a punched-out sheet-metal strip which interlocks in a dovetailed manner at the joint between segment ends, the joint being fixed with a plastic locking part.

6 Claims, 4 Drawing Sheets

_US 6,709,163 B2_

FASTENING CAGE SEGMENT ENDS FOR SHEET-METAL CAGE FOR ROLLING-CONTACT BEARINGS

BACKGROUND OF THE INVENTION

The invention relates to a sheet-metal cage for a rolling-contact bearing and particularly to fastening cage segment ends together.

A sheet-metal cage, like all cages of rolling-contact bearings, guides the rolling bodies in their motion relative to the inner and outer bearing rings and holds the rolling bodies spaced at a distance from one another around the bearing. To optimize the production costs of a sheet-metal cage, it is recommended to produce the sheet-metal cage, for example, from punched-out material strips or segments which are bent in a circular shape and which have their segment ends connected.

Various connections for the ends of cage segments are shown in DE 8008271 U1. These connections include screws and other connecting parts. These are awkward to handle and are suitable for use only for solid cages. U-shaped clamps which hold the cage segments together are also described. The clamps must be fitted by hand, and they also have the problem that they have to absorb the entire centrifugal force of the cage segments. At high rotary speeds, these U-shaped holding clamps may separate from the cage.

SUMMARY OF THE INVENTION

The object of the invention is to provide a sheet-metal cage from individual cage segments and to secure the segments via cost-effective elements.

At least one and possibly two or more cage segments are joined by their opposite cage segment ends. There is a locking connection between the ends, e.g. a dovetail, which holds them circumferentially and a preferably plastic material locking element that passes through an opening through one of the closure parts at a segment end to integrally form the locking element.

An advantage of the invention is that the sheet-metal cage can be produced from sheet-metal strips and therefore circular waste blanks do not occur. After the sheet-metal cage or the sheet-metal cage segments have been punched out and bent into a circular shape, closure parts are interlocked in a positive manner at the joint between cage segment ends. A preferred connection is dovetailed.

The region around the closure parts is fixed by molding on of a plastic locking element, so that the two cage ends can no longer be displaced radially relative to one another. The locking element is molded on simultaneously from radially outside and inside the closure parts. The plastic is connected through an opening in the region of the closure parts to form one part.

The remaining gap in the region of the closure parts at the joint between the cage ends, which gap results from production tolerances, is likewise closed with the molded-on plastic. As a result, forces which act in the region of the cage in the circumferential direction are absorbed by the closure parts, interlocked in a positive manner, at the joint between the cage ends. The locking element therefore does not need to absorb these forces.

DETAILED DESCRIPTION OF PREFERRED EMBODIMENTS

Figure 1:
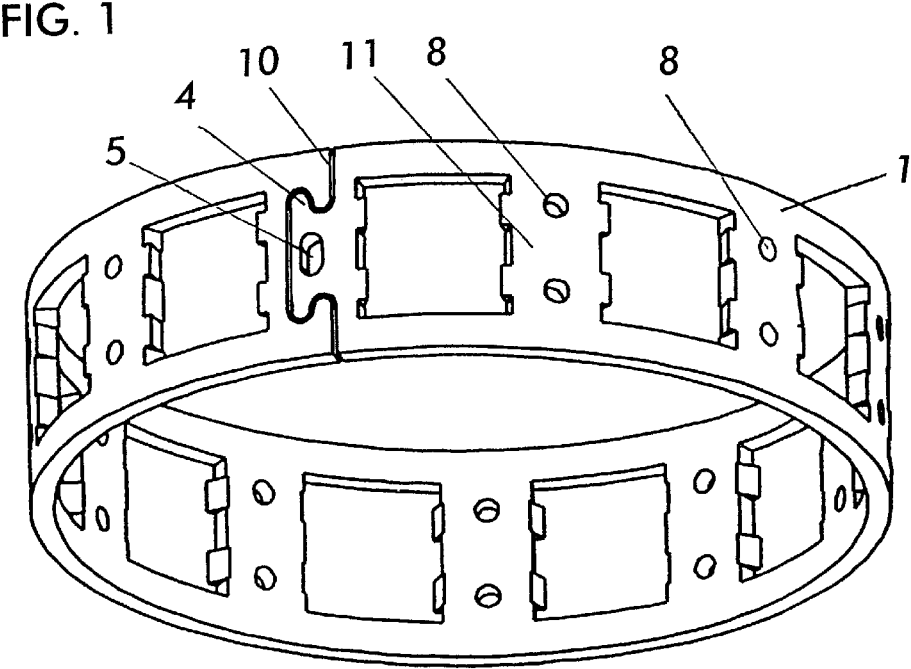
FIG. 1 is a perspective view showing a sheet-metal cage for a cylindrical roller bearing after a circular bending of the cage, but without showing locking elements.

FIG. 1 shows a sheet-metal cage 1 which has been bent into a circular shape for use in a cylindrical roller bearing and shown before the molding-on of the locking element and the holding projections. An interlocking dovetail shaped closure 4 at the joint is depicted. A locking element 6 (shown in FIG. 3) is connected in an integral manner by passing through the opening 5 in the region of the interlocking closure 4 during molding-on of a plastic compound on both sides. As a result, this positive-locking connection in the circumferential direction is secured against radial displacement. Holding projections 9 (shown in FIG. 4), which are likewise molded on at the same time on both sides (like the locking elements), are connected in an integral manner by passing through the openings 8 in the webs 11 which pass between roller openings around the cage.

Figure 2:
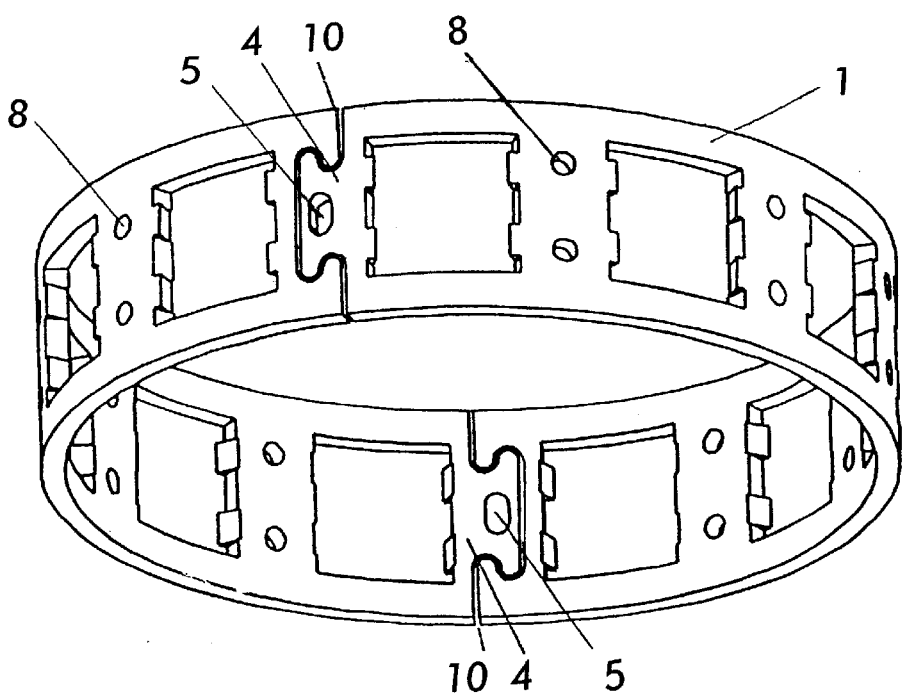
FIG. 2 shows a sheet-metal cage for a cylindrical roller bearing, comprised of two cage segments, after circular bending of the cage segments and again without showing locking elements.

FIG. 2 shows a sheet-metal cage like that in FIG. 1, but this sheet-metal cage is produced from two cage segments.

Figure 3:
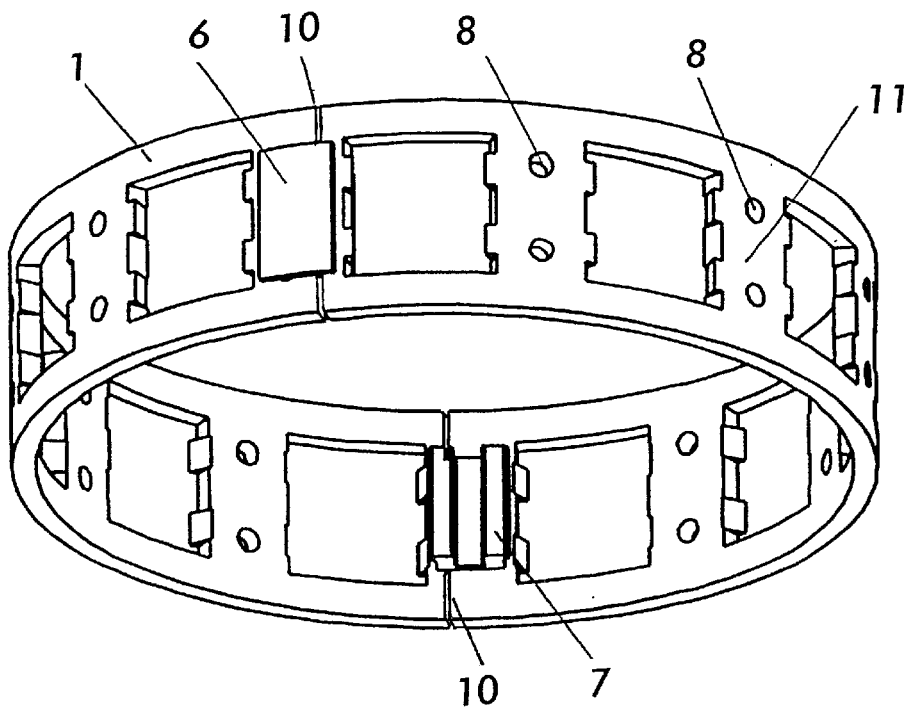
FIG. 3 shows a sheet-metal cage for a cylindrical roller bearing, comprised of two cage segments, after circular bending of the segments and having two locking elements.

FIG. 3 shows a sheet-metal cage as in FIG. 2 on which the locking elements 6 are molded. Radial displacement of the joints 10 is thus also prevented. In addition, the holding projections 7, which hold the bearing rollers (not shown), are also attached to the locking element 6.

Figure 4:
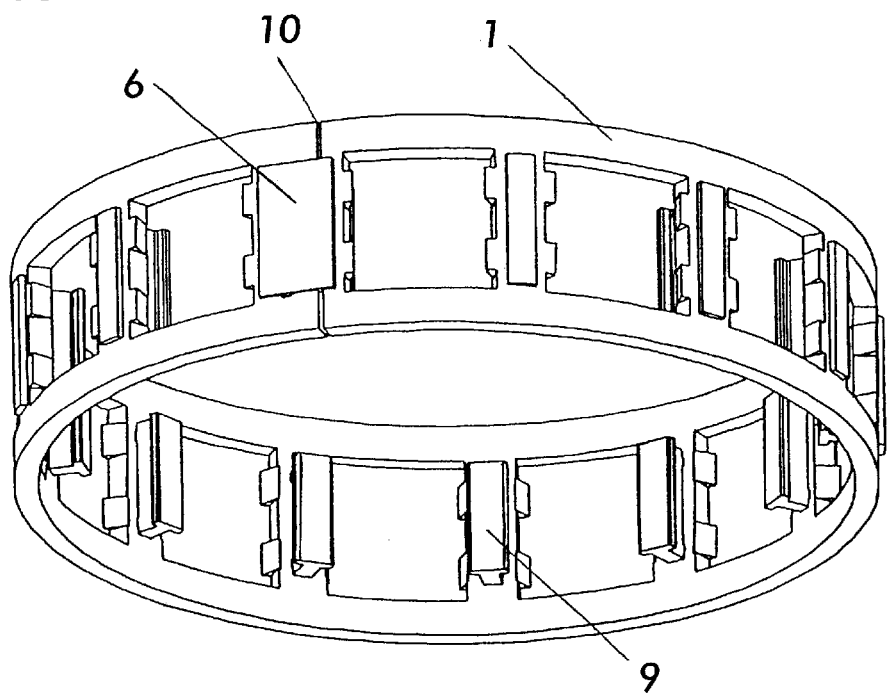
FIG. 4 shows a sheet-metal cage for a cylindrical roller bearing, having a locking element and holding projections directed inward in the web region.

A sheet-metal cage like that in FIG. 1 is also shown in FIG. 4. The single cage end locking element 6 and the holding projections 9 for the rollers (not shown) are molded on this sheet-metal cage. The holding projection 7 on the locking element 6 cannot be seen in this perspective. The holding projections 9 project radially inward of the cage.

Figure 5:
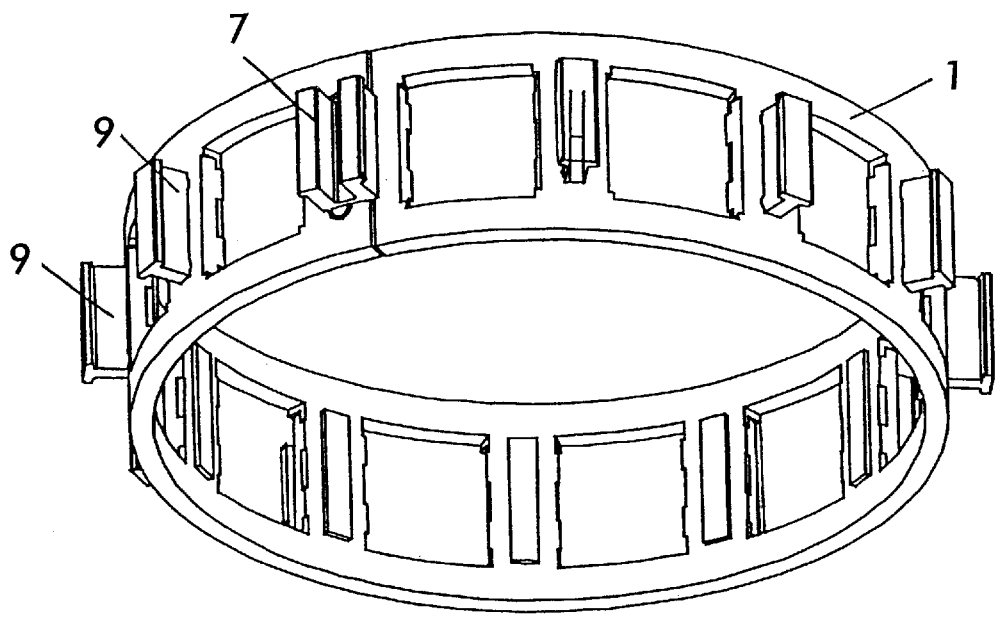
FIG. 5 shows a cage as in FIG. 4, wherein the holding projections are directed outward.

A sheet-metal cage according to FIG. 1 is also shown in FIG. 5. In this embodiment, the holding projections 9 project radially outward. The holding projections 7 on the locking element 6 can be seen in this perspective. Again, the rollers are not shown.

Figure 6:
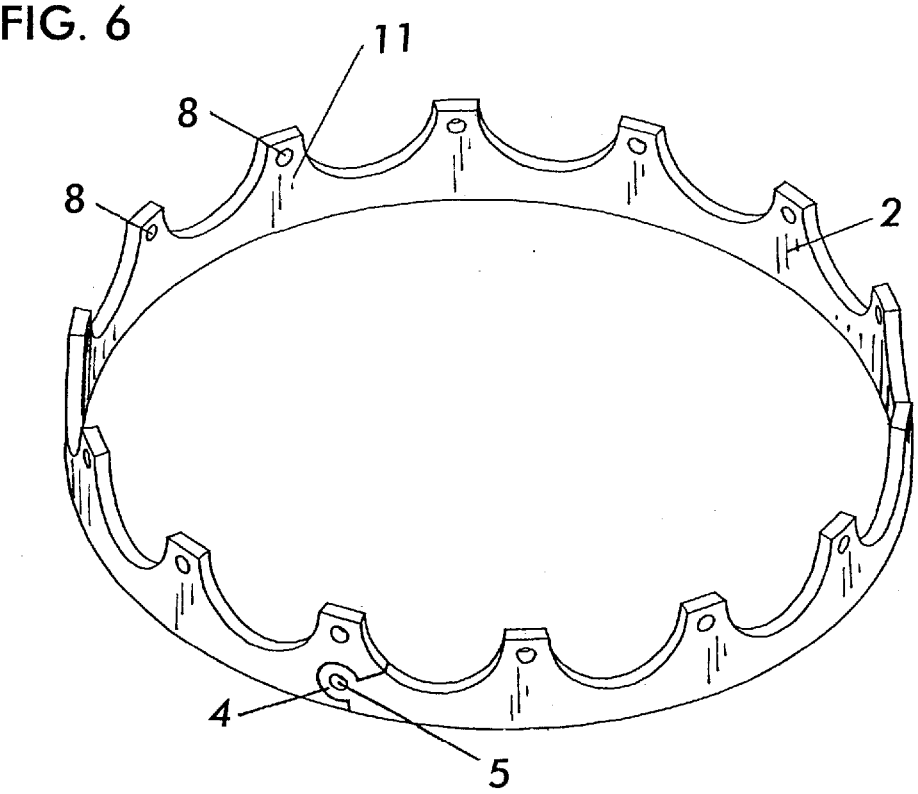
FIG. 6 shows a sheet-metal cage bent into a circular shape for a deep-groove ball bearing, and without locking elements.

A sheet-metal cage 2 for a deep-groove ball bearing is shown in FIG. 6. This cage has been bent into a circular shape after its profile has been punched out. The interlocking closure 4 between cage ends is shown before its encapsulation with a plastic material. A locking element 6' (see FIG. 7) is connected in an integral manner through the opening 5 in the interlocking closure 4 during the molding-on of the plastic compound on both sides. The cage is fixed at the joint

10 by the locking element 6'. The holding projections 9' (FIG. 7) are connected in an integral manner by passing through the openings 8 in the webs 11 during the molding-on of the plastic compound on both sides.

Figure 7:
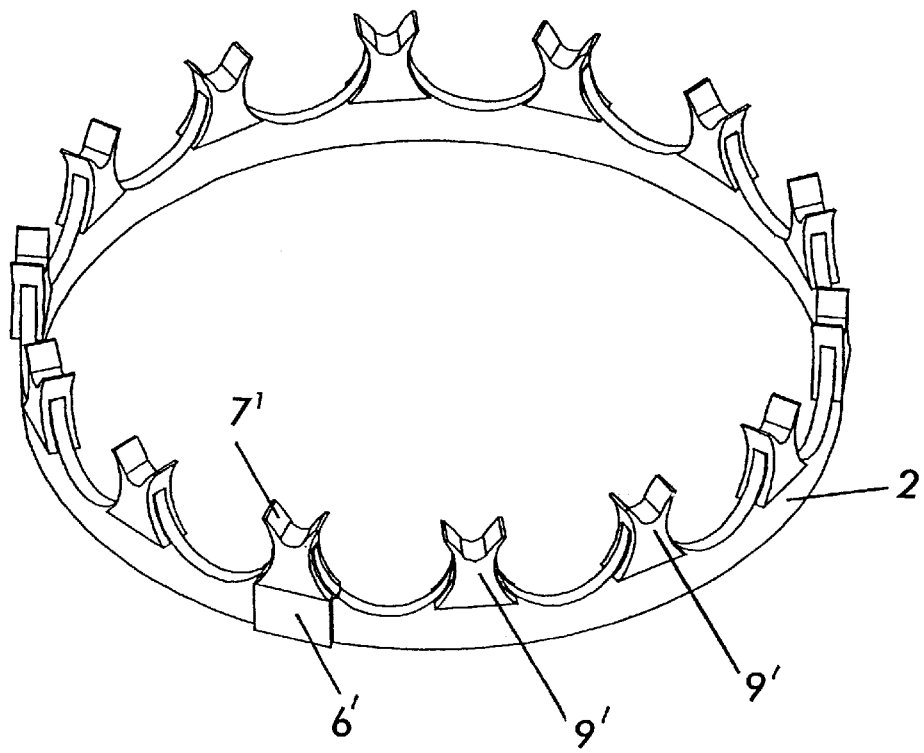
FIG. 7 shows a cage as in FIG. 6 with a locking element disposed at the joint between cage ends and with holding projections in the web region.

A sheet-metal cage as in FIG. 6 is shown in FIG. 7. The locking elements 6' with the holding projections 7' are shown on this cage. The holding projections 9' are molded in place on the webs 11 between the ball sockets around the cage.

Figure 8:
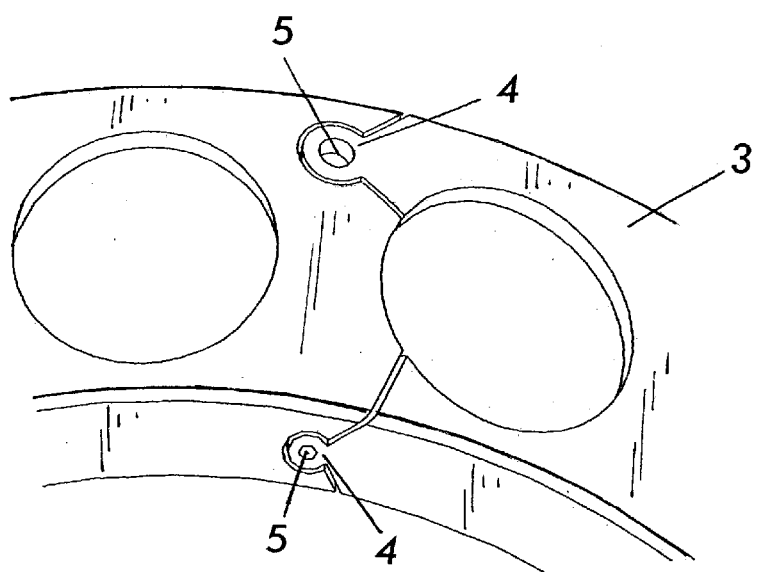
FIG. 8 shows an angular-contact-ball-bearing cage bent into a circular shape and having two closure elements at the joint, without locking elements.

A sheet-metal cage 3 for an angular-contact ball bearing is shown in FIG. 8. The interlocking closure 4 at the joint is shown before the molding-on of the connecting element. In this case, there are two closures 4 spaced apart across the bearing.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sheet-metal cage for rolling-contact bearings, comprising:

at least one cage segment which is in a circular shape, said at least one cage segment having opposite circumferential ends in the circular shape, and two of the cage segment ends meet at a joint;

the cage segment ends having closure parts shaped to interlock in a positive manner in the circumferential direction at the joint;

a plastic locking element for fixing the closure parts at the joint in a non-detachable manner, wherein the locking element is molded in place both radially inside and outside the closure parts, the locking element being connected in an integral manner, to form one part, via an opening through the cage in the region of the closure parts;

the cage having rolling body receiving openings circumferentially around the cage, and webs of the cage between the rolling body receiving openings;

holding projections for holding rolling bodies that are to be guided by the rolling body receiving openings in the cage, a projection being integrally formed on the locking element; and additional holding projections molded in place on the webs of the cage, the additional holding projections being connected to the webs at the rolling body receiving openings and projecting radially both inward and outward of said cage.

2. The sheet-metal cage as claimed in claim 1, wherein there is a plurality of the cage segments arrayed together to define the circular shape, and the cage segment end of one of the segments is fixed to the cage segment end of the adjacent segment.

3. The sheet-metal cage as claimed in claim 1, wherein there is a single cage segment and the opposite ends of the cage segment are fixed to each other.

4. The sheet-metal cage as claimed in claim 1, wherein said cage is adapted for use in a deep-groove ball bearing, comprising ball sockets, and the holding projections are molded in place on said webs of the cage, which are disposed between said ball sockets.

5. The sheet-metal cage as claimed in claim 1, wherein said cage is adapted for use in an angular-contact ball bearing, and comprises second closure parts at said joint, spaced apart on said cage from said first-mentioned closure parts.

6. The sheet-metal cage as claimed in claim 5, wherein said cage has a plurality of circular ball-receiving windows defined therein.

* * * * *